(12) United States Patent
Hicks

(10) Patent No.: US 9,445,548 B1
(45) Date of Patent: Sep. 20, 2016

(54) SADDLE MOUNTING ASSEMBLY FOR A GRAVE MARKER

(71) Applicant: Christopher P. Hicks, New Castle, IN (US)

(72) Inventor: Christopher P. Hicks, New Castle, IN (US)

( * ) Notice: Subject to any disclaimer, the term of this patent is extended or adjusted under 35 U.S.C. 154(b) by 0 days.

(21) Appl. No.: 14/090,708

(22) Filed: Nov. 26, 2013

(51) Int. Cl.
*A01G 5/04* (2006.01)
*A47G 7/02* (2006.01)

(52) U.S. Cl.
CPC .. *A01G 5/04* (2013.01); *A47G 7/02* (2013.01)

(58) Field of Classification Search
CPC ..... A01G 5/04; F16B 23/0092; F16B 35/06; E04H 13/003; E04H 13/001; A47G 7/02
USPC .............. 24/305; 40/124.5; 52/103; 47/41.1, 47/41.14; D99/17, 19
See application file for complete search history.

(56) References Cited

U.S. PATENT DOCUMENTS

| | | | | |
|---|---|---|---|---|
| 1,971,726 A * | 8/1934 | Norwood | ................ | F16B 19/02 411/352 |
| 1,978,329 A * | 10/1934 | Rosenberg | ............. | F16B 15/06 411/455 |
| 2,028,528 A * | 1/1936 | Sipe | ........................ | F16B 19/02 238/14.13 |
| 2,036,875 A * | 4/1936 | Kraft | ............................ | 215/360 |
| 3,112,667 A * | 12/1963 | Brentlinger | ............. | F16B 15/02 411/439 |
| 3,511,461 A * | 5/1970 | Clark | ........................... | 248/27.8 |
| 3,661,406 A * | 5/1972 | Mele | ....................... | F16B 4/004 403/408.1 |
| 3,779,502 A * | 12/1973 | Marberg | ........................ | 410/116 |
| 3,905,570 A * | 9/1975 | Nieuwveld | ...................... | 248/71 |
| 4,532,926 A * | 8/1985 | O'Holla | ........................ | 606/220 |
| 4,640,045 A * | 2/1987 | Nesbitt et al. | ..................... | 47/67 |
| 4,641,986 A * | 2/1987 | Tsui et al. | ..................... | 403/164 |
| D299,088 S | 12/1988 | Monza | | |
| 4,798,569 A * | 1/1989 | Alderfer | ....................... | 474/255 |
| 5,072,542 A | 12/1991 | Quackenbush | | |
| D332,762 S | 1/1993 | McCafferty, Jr. | | |
| D435,230 S | 12/2000 | Spiegel | | |
| 6,564,505 B1 | 5/2003 | Anderson | | |
| 6,688,040 B1 * | 2/2004 | Yang | .............................. | 47/41.1 |
| 7,186,067 B2 * | 3/2007 | Leblanc | ........................ | 411/409 |
| 7,305,794 B1 * | 12/2007 | Cantrell | ....................... | 47/41.12 |
| 7,503,528 B2 * | 3/2009 | Adams et al. | ................... | 248/71 |
| 7,640,694 B1 * | 1/2010 | Cantrell | ....................... | 47/41.12 |
| 7,708,511 B2 * | 5/2010 | Terrill et al. | ................... | 411/400 |
| 8,523,118 B2 * | 9/2013 | Weder | .......................... | 248/27.8 |
| 8,622,675 B2 * | 1/2014 | Chen et al. | ................... | 411/397 |
| 8,622,676 B2 * | 1/2014 | Chen et al. | ................... | 411/402 |
| 8,635,758 B2 * | 1/2014 | Slepecki et al. | ........... | 29/525.02 |
| 8,794,886 B1 * | 8/2014 | Nett et al. | ..................... | 410/107 |
| 2002/0007601 A1 * | 1/2002 | England | ........................ | 52/103 |
| 2005/0242247 A1 * | 11/2005 | Geiger | ........................ | 248/74.3 |
| 2007/0134073 A1 * | 6/2007 | Shereyk | ................ | F16B 21/084 411/510 |
| 2011/0036001 A1 | 2/2011 | Aker | | |

\* cited by examiner

*Primary Examiner* — Robert J Sandy
*Assistant Examiner* — Rowland Do

(57) ABSTRACT

A saddle mounting assembly for a grave marker allows a person to attach a headstone saddle to a grave marker without causing damage to the grave marker. The assembly includes a mounting member configured for attaching to a grave marker. The mounting member includes an upper section and a lower section. An outer surface of the lower section is grooved. A coupler is attached to the upper section. The coupler is configured to releasably couple the mounting member to a grave marker saddle to attach the grave marker saddle to a top surface of the grave marker.

9 Claims, 3 Drawing Sheets

SADDLE MOUNTING ASSEMBLY FOR A GRAVE MARKER

BACKGROUND OF THE DISCLOSURE

Field of the Disclosure

The disclosure relates to mounting devices and more particularly pertains to a new mounting device for allowing a person to attach a headstone saddle to a grave marker without causing damage to the grave marker.

SUMMARY OF THE DISCLOSURE

An embodiment of the disclosure meets the needs presented above by generally comprising a mounting member configured for attaching to a grave marker. The mounting member includes an upper section and a lower section. An outer surface of the lower section is grooved. A coupler is attached to the upper section. The coupler is configured to releasably couple the mounting member to a grave marker saddle to attach the grave marker saddle to a top surface of the grave marker.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
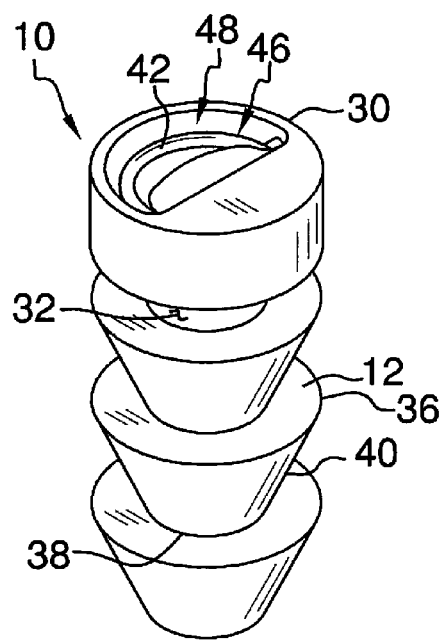
FIG. 1 is a top front side perspective view of a saddle mounting assembly for a grave marker according to an embodiment of the disclosure.
Figure 2:
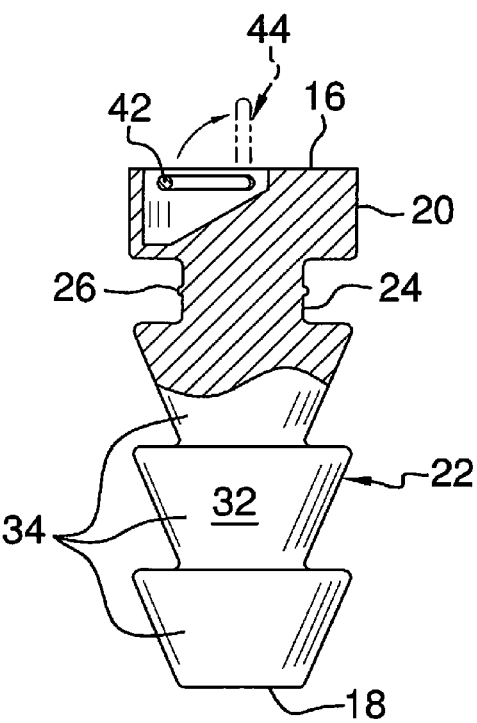
FIG. 2 is a front partial cutaway view of an embodiment of the disclosure.
Figure 3:
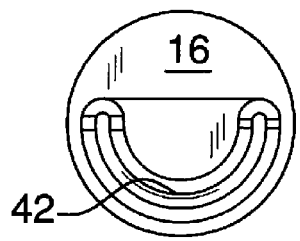
FIG. 3 is a top view of an embodiment of the disclosure.
Figure 4:
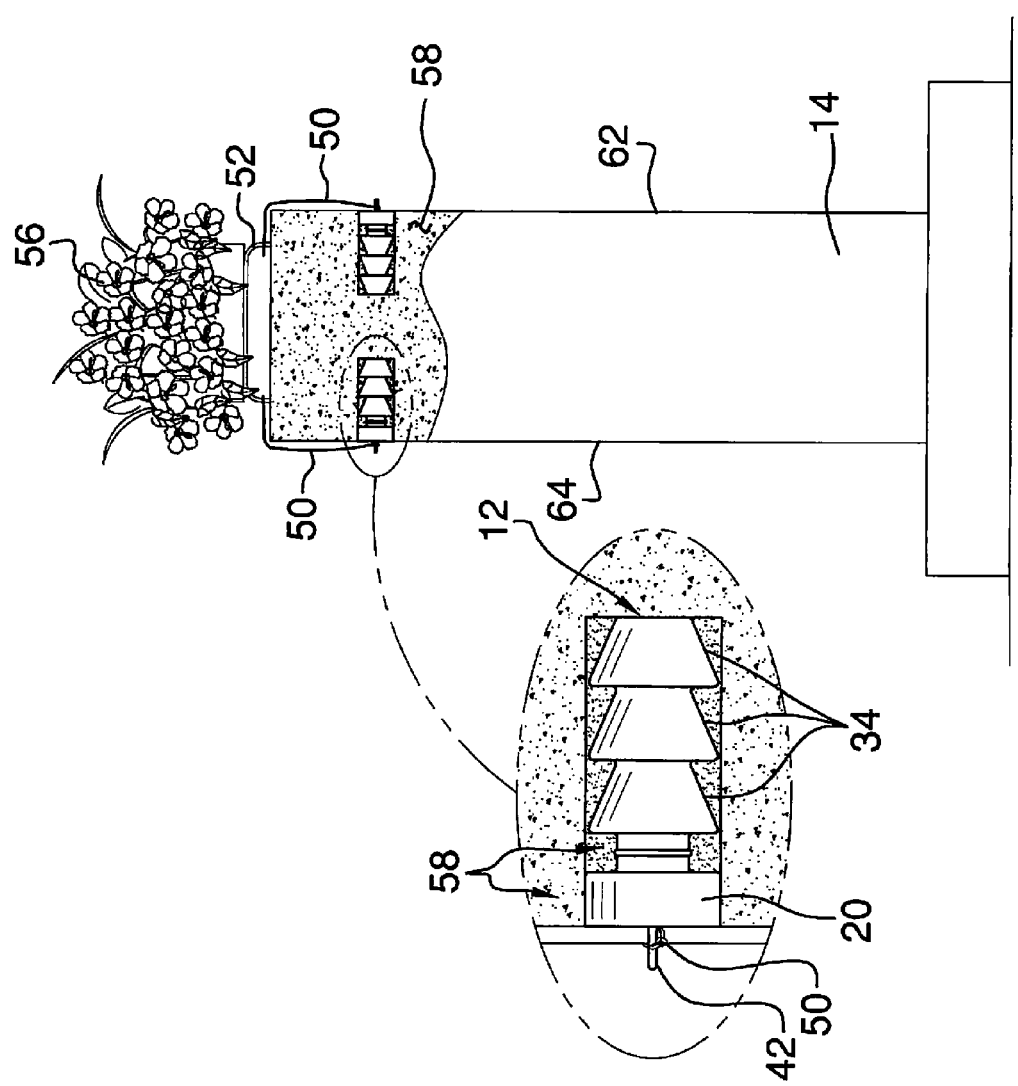
FIG. 4 is a detailed view of an embodiment of the disclosure in use.
Figure 5:
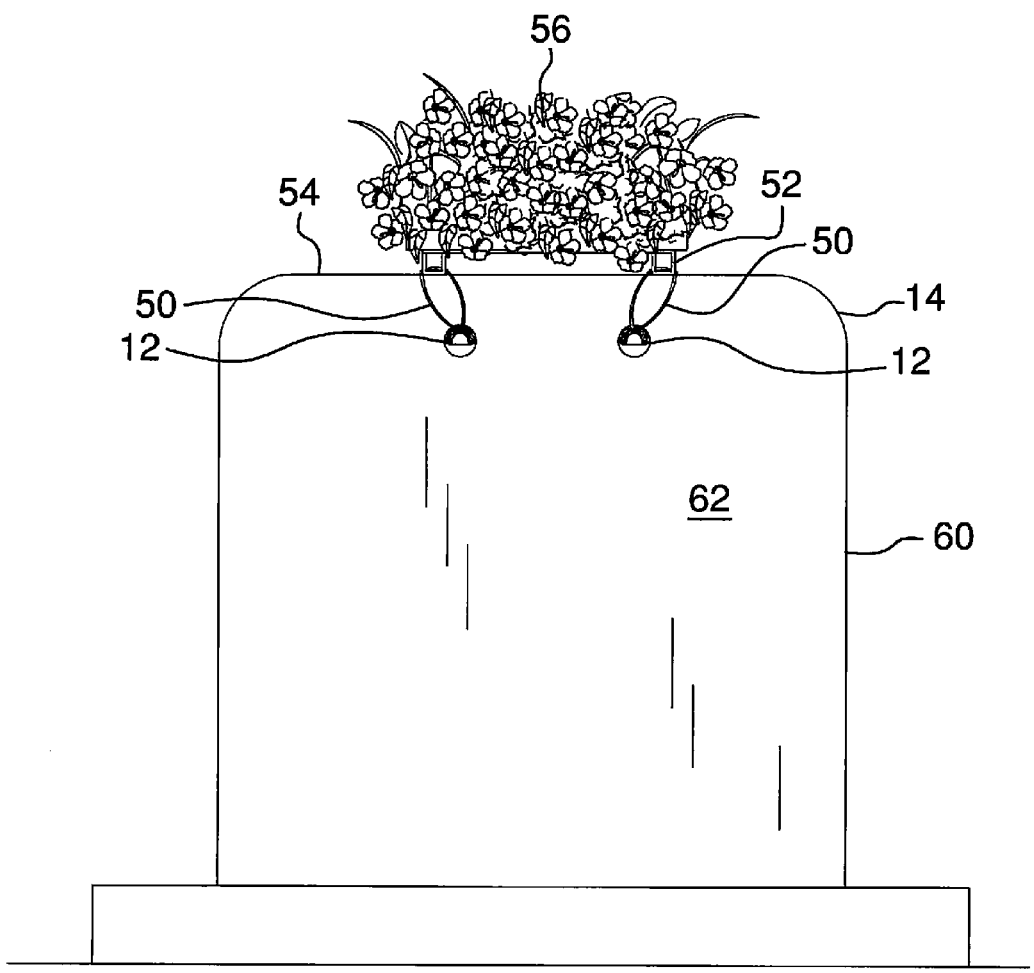
FIG. 5 is an in-use view of an embodiment of the disclosure.

With reference now to the drawings, and in particular to FIGS. 1 through 5 thereof, a new mounting device embodying the principles and concepts of an embodiment of the disclosure and generally designated by the reference numeral 10 will be described.

As best illustrated in FIGS. 1 through 5, the saddle mounting assembly for a grave marker 10 generally comprises a mounting member 12 configured for attaching to a grave marker 14. The mounting member 12 has an uppermost surface 16 and a lowermost surface 18. The mounting member includes an upper section 20, a lower section 22 and an intermediate section 24 coupled to and extending between the upper section 20 and the lower section 22. An outwardly projecting lip 26 is coupled to the intermediate section 24. The lip 26 may extend a full length around an outer surface 28 of the intermediate section 24. The lip 26 is integrally coupled to the intermediate section 24. A longitudinal axis extends through the mounting member 12 between the uppermost surface 16 and the lowermost surface 18. The upper section 20 includes the uppermost surface 16. The lower section 22 includes the lowermost surface 18. The upper section 20 may have an annular perimeter edge 30. The upper section 20 has a greater width than the intermediate section 24. The mounting member 12 is constructed from a durable material, such as stainless steel or the like.

An outer surface 32 of the lower section 22 is grooved wherein the lower section 22 defines a plurality of frustoconical portions 34. Each of the frustoconical portions 34 is coupled to an adjacently positioned one of the frustoconical portions 34. Each of the frustoconical portions 34 is collinear with respect to each other and aligned along the longitudinal axis of the mounting member 12. Each of the frustoconical portions 34 has a top edge 36, a bottom edge 38 and an angled peripheral edge 40 extending between the top edge 36 and the bottom edge 38. Each of the top edges 36 is positioned transverse relative to the longitudinal axis of the mounting member 12. Each of the angled peripheral edges 40 extends downwardly and inwardly from the associated top edge 36.

A coupler 42 is attached to the mounting member 12 at the uppermost surface 16. In particular, the coupler 42 comprises a ring. The coupler 42 is pivotable relative to the uppermost surface 16 wherein the coupler 42 is positionable in an extended position 44 and a retracted position 46. The coupler 42 extends outwardly from the uppermost surface 16 when the coupler 42 is in the extended position 44. A depression 48 extends into the uppermost surface 16. The coupler 42 is positionable within the depression 48 when the coupler 42 is in the retracted position 46. A connector 50, such as a conventional cable tie or the like, is couplable to the mounting member 12. The connector 50 is extendable around the coupler 42 and configured to releasably couple the mounting member 12 to a grave marker saddle 52 to attach the grave marker saddle 52 to a top surface 54 of the grave marker 14. The grave marker saddle 52 is generally conventional and is used to hold flowers 56 on the top surface 54 of the grave marker 14.

The mounting member 12 may have a length between approximately 4.0 centimeters and 14.0 centimeters and a diameter between approximately 2.0 centimeters and 6.5 centimeters. Each of the frustoconical portions 34 may have a width between approximately 1.2 centimeters and 4.2 centimeters.

In use, as stated above and shown in the Figures, a hole is drilled into a perimeter wall 60 of the grave marker 14 near the top surface 54 of the grave marker 14. An adhesive 58, such as epoxy, is positioned within the hole. The grooved nature of the outer surface 32 of the lower section 22 helps to ensure that the mounting member 12 and the adhesive 58 form a tight seal. The lowermost surface 18 of the mounting member 12 is then pushed into the hole against the adhesive 58 to secure the mounting member 12 to the adhesive 58. The coupler 42 extends outwardly of the perimeter wall 60 of the grave marker 14. The grave marker saddle 52 is positioned on the top surface 54 of the grave marker 14 and flowers 56 are placed therein. The connector 50 is attached to each of the coupler 42 and the grave marker saddle 52. For a secure attachment, a plurality of mounting members 12 and a plurality of couplers 42 is provided. In particular, two of the mounting members 12 may be attached to a front surface 62 of the grave marker 14, while two of the mounting members 12 may be attached to a back surface 64 of the grave marker 14 in the manner described above. Thus, each mounting member 12 is inserted into an associated hole and each is attached to the grave marker saddle 52 using an associated coupler 42.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A grave marker saddle mounting assembly, said assembly comprising:
    a grave marker, a hole extending into a perimeter wall of said grave marker, said hole having a constant diameter extending along a length of said hole;
    a grave marker saddle positionable on said grave marker;
    a mounting member attachable to said grave marker by insertion into said hole, said mounting member including an upper section and a lower section, an outer surface of said lower section being grooved, said mounting member having an uppermost surface and a lowermost surface, said upper section including said uppermost surface, said lower section including said lowermost surface, wherein said lower section defines a plurality of frustoconical portions, each of said frustoconical portions being coupled to an adjacently positioned one of said frustoconical portions, each of said frusto-conical portions being aligned and having an equivalent outer diameter wherein each said frustoconical portion is positioned to contact an interior surface of said hole when said mounting member is inserted into said hole, said upper section having an annular perimeter edge aligned with said frusto-conical portions and complementary to said diameter of said hole wherein said upper section is insertable into said hole such that said uppermost surface is flush with an outer surface of said grave marker;
    a coupler attached to said upper section, said coupler releasably coupling said mounting member to said grave marker saddle to attach said grave marker saddle to a top surface of said grave marker, wherein said coupler is attached to said uppermost surface, said coupler being pivotable relative to said uppermost surface wherein said coupler is positionable in an extended position and a retracted position, said coupler extending outwardly from said uppermost surface when said coupler is in the extended position; and
    a depression extending into said uppermost surface, said coupler being positionable within said depression when said coupler is in the retracted position.

2. The assembly of claim 1, further comprising an intermediate section coupled to and extending between said upper section and said lower section, said upper section having a greater width than said intermediate section.

3. The assembly of claim 1, further comprising a longitudinal axis extending through said mounting member between said uppermost surface and said lowermost surface, each of said frustoconical portions being collinear with respect to each other and aligned along said longitudinal axis of said mounting member.

4. The assembly of claim 1, further comprising each of said frustoconical portions having a top edge, a bottom edge and an angled peripheral edge extending between said top edge and said bottom edge, each of said angled peripheral edges extending downwardly and inwardly from said associated top edge.

5. The assembly of claim 4, further comprising a longitudinal axis extending through said mounting member between said uppermost surface, each of said top edges being positioned transverse relative to said longitudinal axis of said mounting member.

6. The assembly of claim 1, further comprising:
    an intermediate section coupled to and extending between said upper section and said lower section; and
    an outwardly projecting lip coupled to said intermediate section, said lip extending a full length around an outer surface of said intermediate section.

7. The assembly of claim 1, wherein said coupler comprises a ring.

8. The assembly of claim 1, further comprising a connector couplable to said mounting member, said connector being extendable around said coupler and releasably coupling said mounting member to said grave marker saddle to attach said grave marker saddle to said top surface of said grave marker.

9. A grave marker saddle mounting assembly, said assembly comprising:
    a grave marker, a hole extending into a perimeter wall of said grave marker, said hole having a constant diameter extending along a length of said hole;
    a grave marker saddle positionable on said grave marker;
    a mounting member attachable to said grave marker by insertion into said hole, said mounting member having an uppermost surface and a lowermost surface, said mounting member including an upper section, a lower section and an intermediate section coupled to and extending between said upper section and said lower section, a longitudinal axis extending through said mounting member between said uppermost surface and said lowermost surface, said upper section including said uppermost surface, said lower section including said lowermost surface, said upper section having a greater width than said intermediate section, an outer surface of said lower section being grooved;
    wherein said lower section defines a plurality of frustoconical portions, each of said frustoconical portions being coupled to an adjacently positioned one of said frustoconical portions, each of said frustoconical portions being collinear with respect to each other and aligned along said longitudinal axis of said mounting member, each of said frustoconical portions having a top edge, a bottom edge and an angled peripheral edge extending between said top edge and said bottom edge, each of said top edges being positioned transverse relative to said longitudinal axis of said mounting member, each of said angled peripheral edges extending downwardly and inwardly from said associated top edge, each of said frusto-conical portions being aligned and having an equivalent outer diameter wherein each said frusto-conical portion is positioned to contact an interior surface of said hole when said mounting member is inserted into said hole;

said upper section having an annular perimeter edge aligned with said frusto-conical portions and complementary to said diameter of said hole wherein said upper section is insertable into said hole such that said uppermost surface is flush with an outer surface of said grave marker;

an outwardly projecting lip coupled to said intermediate section, said lip extending a full length around an outer surface of said intermediate section, said lip being integrally coupled to said intermediate section;

a coupler attached to said mounting member at said uppermost surface, said coupler comprising a ring, said coupler being pivotable relative to said uppermost surface wherein said coupler is positionable in an extended position and a retracted position, said coupler extending outwardly from said uppermost surface when said coupler is in the extended position;

a depression extending into said uppermost surface, said coupler being positionable within said depression when said coupler is in the retracted position; and a connector couplable to said mounting member, said connector being extendable around said coupler and configured to releasably couple said mounting member to said grave marker saddle to attach said grave marker saddle to said top surface of said grave marker.

* * * * *